Feb. 1, 1966 F. E. DEEMS 3,231,939
APPARATUS FOR GINNING COTTON
Filed April 12, 1963 3 Sheets-Sheet 1
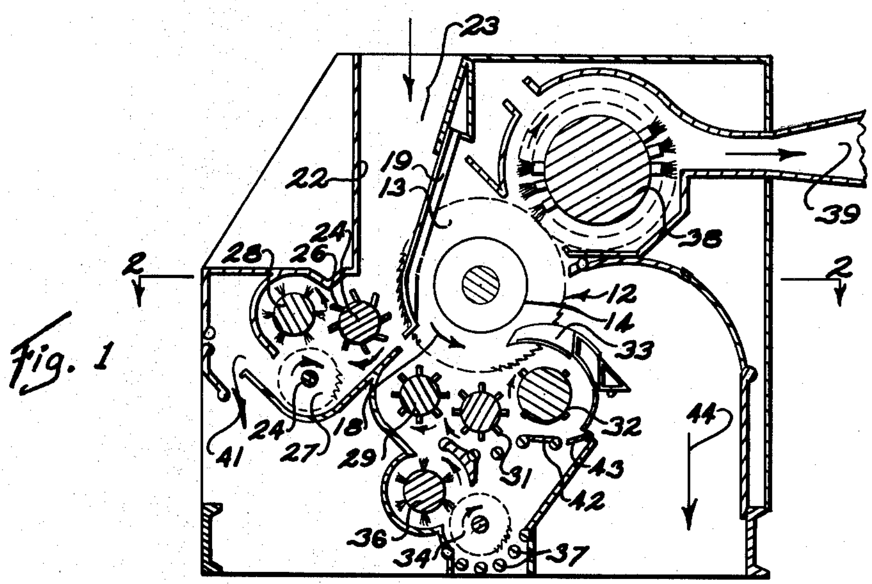
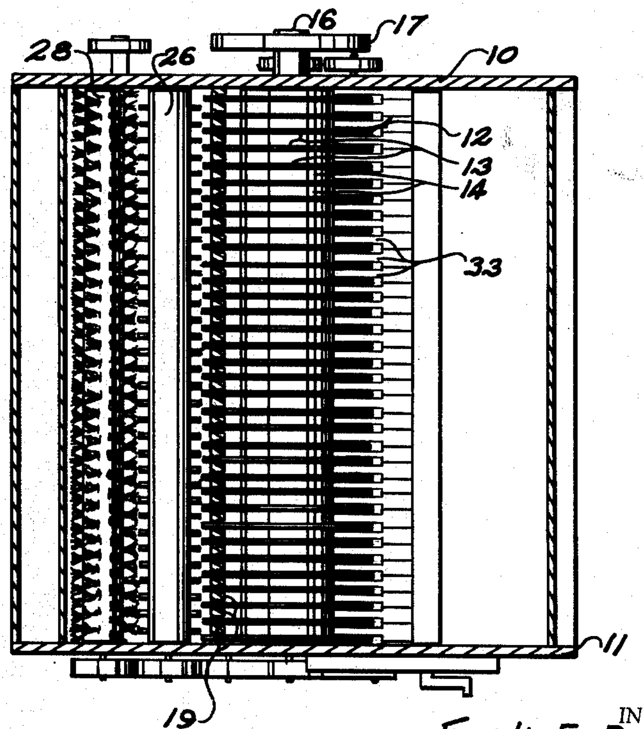
INVENTOR.
Frank E. Deems
BY Jennings, Carter & Thompson
Attorneys

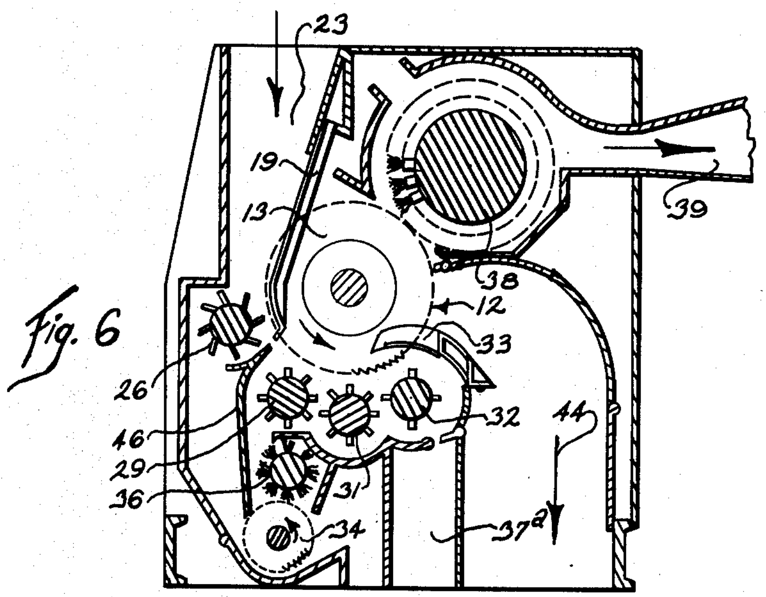
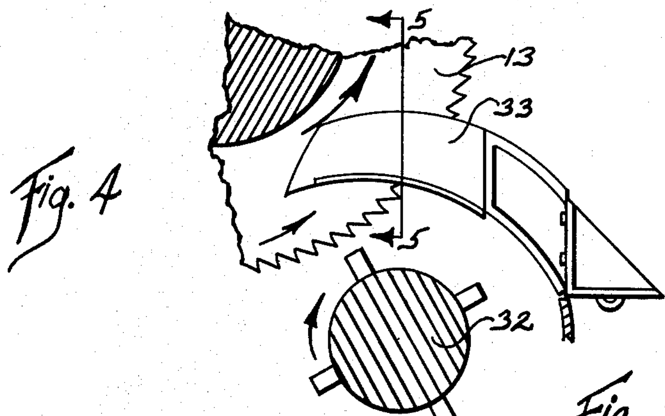
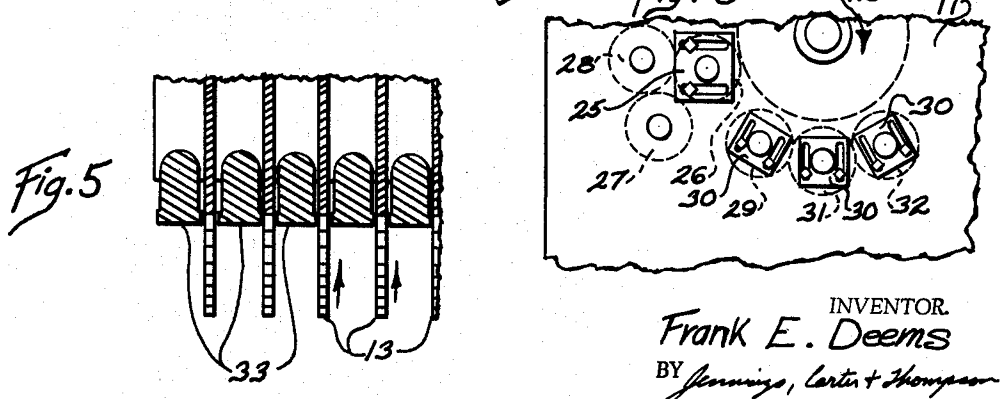
INVENTOR.
Frank E. Deems
BY Jennings, Carter + Thompson
Attorneys Feb. 1, 1966 F. E. DEEMS 3,231,939
APPARATUS FOR GINNING COTTON
Filed April 12, 1963 3 Sheets-Sheet 3
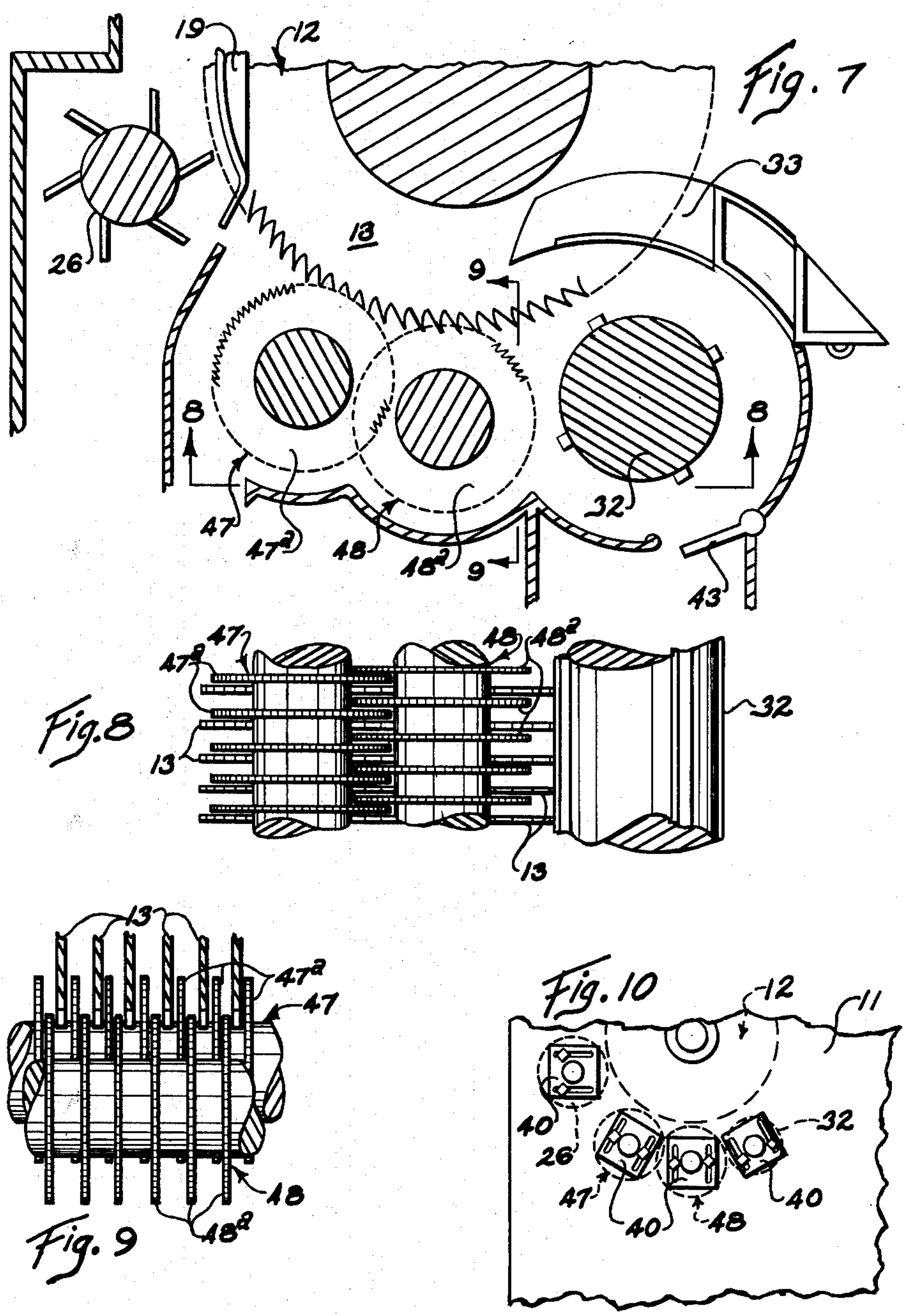
INVENTOR.
Frank E. Deems
BY Jennings, Carter & Thompson
Attorneys United States Patent Office 3,231,939

Patented Feb. 1, 1966

3,231,939
APPARATUS FOR GINNING COTTON

Frank E. Deems, 5400 5th Terrace S., Birmingham, Ala.

Filed Apr. 12, 1963, Ser. No. 272,661
2 Claims. (Cl. 19—58)

This invention reates to a process for ginning cotton and to a saw type cotton gin capable of carrying out such process.

In the ginning of cotton it heretofore has been customary for the seed cotton to be fed into a roll box where it is acted upon by the saws. The seed cotton packs tightly in the roll box and the saws project through the ginning ribs into such tightly packed, relatively dense mass of cotton. Repeated action of the rotating saws on such roll of cotton results in eventually removing the lint from the seeds which, when clean, drop out of the roll. The roll is maintained tight and compressed by continuously feeding seed cotton to it at substantially the same rate of discharge therefrom of the lint and seed. It is known that there is some damage to the fiber in such gins. Further, wear and tear on the saws, particularly the teeth thereof, is high and the friction developed between the saws and roll requires the expenditure of an appreciable amount of power over and above that which is only required to remove the lint from the seeds. Inherently, the capacity of the roll box gin is limited below the actual fiber removing capacity of the saws.

In view of the foregoing the prime object of my invention is to provide an improved process for ginning and an improved gin of the saw type in which the roll box, and hence the disadvantages incident thereto, are eliminated.

My invention contemplates the process of ginning cotton which comprises passing the seed cotton in a thin stream into contact with a portion of the periphery of a rotating saw cylinder, whereby the lint is removed from the seeds and the seeds drop out of such stream, or near one end thereof.

Another object is to provide a process of the character described in which said thin stream of cotton is moved transversely of a portion of the periphery of the rotating saw cylinder while at the same time causing the locks of cotton to roll over and over, or tumble, thus to present the lint-carrying seeds to the saws in most efficient manner for removal of the lint.

Another object is to provide a cotton gin embodying the features mentioned above in which there are provided the usual huller ribs through which the locks of cotton are drawn, together with a plurality of rotating, roller-like or saw-like members associated with the ginning periphery of the saw cylinder and to which the locks of cotton drawn through the huller ribs are delivered, whereby the individual locks are presented to the ginning portions of the periphery of the saws, almost individually, together with ginning ribs located at the opposite side of the thin stream of cotton and means to doff the lint from the saws.

Apparatus illustrating the constructional features of my invention and which is capable of carrying out my improved process is shown in the accompanying drawings, forming a part of this application, in which:

FIG. 1 is a vertical cross sectional view of my improved gin;

FIG. 2 is a fragmental sectional view taken generally along line 2—2 of FIG. 1;

FIG. 3 is a fragmental end elevation illustrating the adjustability of certain parts relative to the saw cylinder;

FIG. 4 is an enlarged detail fragmentary sectional view illustrating the relationship of the saws and the ginning ribs;

FIG. 5 is an enlarged detail sectional view through the ginning ribs taken generally along line 5—5 of FIG. 4;

FIG. 6 is a view corresponding generally to FIG. 1 and showing a slightly modified form;

FIG. 7 is a vertical cross sectional view, drawn to a slightly enlarged scale, and showing still a further slight modification;

FIG. 8 is a detail sectional view taken generally along line 8—8 of FIG. 7;

FIG. 9 is a detail sectional view taken generally along line 9—9 of FIG. 7; and

FIG. 10 is a fragmental end elevational view of the modification of FIG. 7.

Referring now to the drawings for a better understanding of my invention and particularly to FIGS. 1, 2 and 3, I show my improved gin as comprising heads or end frames 10 and 11. Mounted in suitable bearings in the heads 10 and 11 is a saw cylinder indicated generally by the numeral 12 and which as will be understood embodies a plurality of individual saws 13 spaced from each other by spacer blocks or the like 14, all being mounted on a shaft 16 as shown in FIG. 2. The shaft may be provided with a pulley 17 over which is trained a belt or the like, not shown, for rotating the saw cylinder in the direction of arrow 18, in a manner well understood.

Mounted in suitable manner so as to project downwardly between the saws are a plurality of huller ribs 19. It will be understood that portions of the peripheries of the saws project outwardly of the huller ribs, that is, to the left as viewed in FIG. 1. A wall 22 is spaced from the projecting portions of the saws just mentioned and the cotton to be ginned is fed downwardly into the opening 23 between the wall 22 and the huller ribs 19.

Mounted on a suitable shaft 24, located adjacent the lower end of the wall 22 and driven in the direction indicated by the arrow is a picker roll or drum 26. Also mounted for rotation on a shaft 24 is a reclaiming saw 27. Associated with the reclaiming saw 27 is a rotary brush 28. The units 26, 27 and 28 act as a reclaiming unit, thus to present back to the saws 13 any cotton which may not be initially drawn through the huller ribs. The shaft of unit 26 may be mounted in bearings carried by a plate 25, slotted as shown and secured to the gin heads 10 and 11 so as to be adjustable toward and from the saw cylinder 12.

Suitably mounted for rotation beneath the saw cylinder are a plurality of driven units 29, 31 and 32. These units may each be in the form of drums which extend the length of the saw cylinder. The shafts of these units are journaled in bearing plates 30 adjustably secured to the heads 10 and 11 and carry projecting pins or the like on the peripheries thereof. As will later appear, these units form what might be called a rotating bed on which the seed cotton is passed from the huller ribs to maintain it in contact with the saws in a thin, moving stream. The units are rotated in the same direction as the adjacent periphery of the saw cylinder as shown by the arrows.

Mounted just above the unit 32 is a series of ginning ribs 33. It will be understood that these ribs project between the saws 13 and that they perform the function of the normal ginning ribs in the usual cotton gin.

Beneath the units 29, 31 and 32 I mount another reclaiming saw cylinder 34 and associate with this saw cylinder a brush 36. A number of grid bars 37 may be provided in close proximity to the bottom of the saw cylinder 34.

Disposed for cooperation with the main or ginning saw cylinder 12 is a doffing brush 38 mounted for rotation in the heads 10 and 11 and driven in the usual manner. Lint from the saws is discharged through the lint duct 39.

From the foregoing the operation of the modification of my invention just described may now be explained and understood. Seed cotton is fed downwardly through the opening 23 where it is engaged by the portion of the peripheries of the saws projecting through the huller ribs 19. The reclaiming unit including the cylinder 27, doffer 28 and spiked roller 26 all assure that no cotton is lost, but that the hulls, trash, sticks and the like removed from the cotton are discharged into the opening indicated by the arrow 41. The seed cotton is drawn through the huller ribs where it is immediately contacted by the first of the rotary units 29. It will be noted that the clearance between the ends of the pins or spikes on the units 29, 31 and 32 is fairly close to the saw cylinder 12. Actually, I prefer to make this clearance no more than about one inch, namely, approximately twice the thickness of the average lock of cotton. As the stream of cotton is drawn through the huller ribs, it is subjected to the upward kicking or throwing action of the units 29, 31 and 32, thus to maintain the stream of cotton in a more or less agitated state, and to convey it transversely of the longitudinal axis of the saw cylinder. It will be understood further that if the saw cylinder is rotating at 600 r.p.m., the units 29, 31 and 32 may be operated at the same speed, but due to their smaller diameter, the peripheral speed of the units 29, 31 and 32 will be much less than the peripheral speed of the saw cylinder. Thus, the cotton passes from the huller ribs to the ginning ribs 33 in a thin, transversely moving, agitated stream in such manner that the locks roll or tumble, thus presenting them effectively to the saw cylinder. Actually, it is to be expected that a good bit of pre-ginning is accomplished immediately upon contact of the seed cotton with the saws, even at the first of the rotary units 29. Upon being completely cleaned of seed, adjacent the ginning ribs 33, the seeds are free to fall downwardly, it being noted that the clockwise rotation (as viewed in FIG. 1) of the last of the rotary units aids in seed discharge. The seeds are discharged without having to pass through the cotton being ginned, as in conventional gins. I may provide beneath the rotary unit 32 an imperforate plate portion 42 and seed fingers 43.

It will be especially noted that due to the action of the saws on the thin stream of cotton, full opportunity is afforded for the saws to become completely loaded with the lint. Furthermore, by operating upon the thin stream of cotton ample opportunity is afforded for sticks, trash and the like to drop out of the stream, where they may be discharged along with the seeds. Still further, it will be noted that any motes which are thrown off inwardly, that is, to the right of the ginning ribs 33 as viewed in FIG. 1, pass downwardly as indicated by the arrow 44, to be discharged from the gin. Lint of course is doffed by the brush 38 into the lint duct 39.

Referring now to FIG. 6 I show a slightly modified form of my invention in which in essence I have modified the seed cotton reclaiming section. Thus, I employ at the bottom of the opening or feed passage 23 the single spiked roller 26. Further, I show a slightly modified arrangement of the reclaiming section beneath the rotary units 29, 31 and 32. I mount the brush 36 alongside a wall 46 and the reclaiming saw 34 is mounted directly beneath the brush 36. The seed discharge passage is at 37$^a$ and the passage 44 is maintained for discharging the motes, trash and the like thrown off by the saws in moting. Except for these changes the operation of the modification shown in FIG. 6 is substantially identical with that already described.

Referring now particularly to FIGS. 7 to 10 I show a still further modified form. In this instance instead of using spiked rollers in association with the lower portion of the saw cylinders, I provide a first rotary unit 47 in the form of a saw cylinder. The saws 47$^a$ of the saw cylinder 47 may project slightly up between the saws 13 of the main or ginning saw cylinder 12. Furthermore, I provide a second saw cylinder 48 whose saws 48$^a$ overlap or intermesh with the saws 47$^a$ and which also may project up between the saws 13 of the saw cylinder. The spiked roller 26 as well as the saw cylinders 47 and 48 and the rotary unit 32 may be mounted on slotted plates 40, secured by bolts to the gin heads so as to be adjustable toward and from the saw cylinder 12.

In the modification being described cotton is drawn through the huller ribs 19, is immediately engaged by the first saws 47 and is more forcefully fed to the peripheries of the saws 13 than in the two modifications previously described. However, it will be noted that the cotton progresses in a thin stream, across the bottom of the periphery of the saw cylinder 12, is moved transversely from cylinder 47 to cylinder 48 and is eventually engaged again by the rotary unit 32, thus to be presented to the ginning ribs 33. It will be understood that the units of FIGS. 7 to 10 is equipped with the same doffing brush 38, frame members and the like which are omitted as being repetitious. Still further, one may employ the reclaiming sections with this form of the invention if desired. It will further be understood that the saw cylinders 47 and 48 are in the form of saws mounted on a shaft for rotation and are driven in suitable manner, but at a peripheral speed considerably less than the peripheral surface speed of the ginning saw cylinder 12.

From the foregoing it will be apparent that I have invented an improved process and apparatus for ginning seed cotton. My invention is particularly characterized, as stated, by the absence of a roll box. I thus eliminate the likelihood of choking of the gin which is known to occur in roll box machines. I further reduce the power required for rotating the saws because I have reduced the friction against the saws of the cotton in such roll box. In the roll box machines it is necessary to dump the box frequently due to accumulation of foreign matter such as sticks, stems and hull trash, such operation of course causing a loss of ginning time, and this has been eliminated.

It will be noted that my improved process and apparatus contemplates feeding the seed cotton to the ginning saws in the same direction that the saws rotate. In fact, all the rotating elements associated with the saw cylinder turn in the same direction as the saw cylinder, namely, in the direction to feed cotton with the saw cylinder. This therefore prevents the formation of rolls, wads or the like which would tend to choke the ginning ribs. Hulls, sticks and trash of all types which are rejected by the huller ribs fall downwardly away from the cotton stream and do not pass through the incoming feed as heretofore has been the case with gins. Such trash as is drawn through the huller ribs is quite free to fall downwardly, through the thin stream of cotton being operated upon the saw cylinder 12. Unginned or partially ginned cotton is returned to the main saw on the underside of rollers 29, 31 and 32. The seeds are free to be discharged from the apparatus without interference and are in a loose state, thereby increasing the capacity of the gin. It will also be noted that my improved gin is free to mote over the tops of the ginning ribs to an opening connected directly to the atmosphere, thereby eliminating the need for vacuum seals, conveyors, wipers and the like.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A combination with a cotton gin of the type having a rotary saw cylinder embodying a plurality of spaced saws together with a plurality of huller ribs and ginning ribs operatively associated with the saws at peripherally spaced positions on the saws, of (a) means to feed seed cotton to the saw cylinder on the outer side of the huller ribs to be drawn therethrough by the saws, (b) a plurality of rotary units disposed generally side by side and located as a group beneath the saw cylinder between the inner side of the huller ribs and the ginning ribs and placed close enough to the saws to maintain the cotton in a moving thin stream and in contact with portions of the peripheries of the saws between the huller and ginning ribs, and (c) means to doff from the saw cylinder lint removed from the seed, which means is located past the ginning ribs.

2. In a cotton gin, (a) a rotary saw cylinder having a plurality of individual axially spaced ginning saws, (b) means adjacent a portion of the lower periphery of the saw cylinder to hold in fiber removing contact with the saws a thin stream of seed cotton which is moving transversely of the saw cylinder, (c) huller ribs cooperating with the ginning saws and located rearwardly of said means, (d) ginning ribs cooperating with the ginning saws and located forwardly of said means, and (e) means to doff lint from the saws and located forwardly from the ginning ribs.

References Cited by the Examiner

UNITED STATES PATENTS

| | | | |
|---|---|---|---|
| 475,206 | 5/1892 | Crooker | 19—56 |
| 608,729 | 8/1898 | Swenson | 19—57 |
| 616,466 | 12/1898 | Hutchinson | 19—57 |
| 633,993 | 10/1899 | Graves | 19—55 X |
| 938,224 | 10/1909 | Doremus | 19—55 X |
| 1,266,826 | 5/1918 | Krupp | 19—55 |
| 1,751,306 | 3/1930 | Cumpston | 19—57 |
| 1,751,307 | 3/1930 | Cumpston | 19—57 |
| 1,767,894 | 6/1930 | Petty et al. | 19—55 |
| 1,823,135 | 9/1931 | Elliott | 19—56 |
| 2,050,164 | 8/1936 | Cumpston et al. | 19—57 |
| 2,072,978 | 3/1937 | Cumpston | 19—56 X |

DONALD W. PARKER, *Primary Examiner.*